United States Patent [19]
Peck

[11] 3,795,139
[45] Mar. 5, 1974

[54] SNUBBER SEAL LEAKAGE TEST CIRCUIT
[75] Inventor: Daniel Anthony Peck, South Windsor, Conn.
[73] Assignee: Combustion Engineering, Inc., Windsor, Conn.
[22] Filed: Dec. 23, 1971
[21] Appl. No.: 211,379

[52] U.S. Cl. .............................. 73/40.5 R, 73/46
[51] Int. Cl. ...................... G01m 3/00, G01m 3/22
[58] Field of Search ......... 73/40, 40.5 R, 47, 46, 49

[56] References Cited
UNITED STATES PATENTS
| | | | |
|---|---|---|---|
| 3,362,215 | 1/1968 | Weinstock | 73/47 |
| 3,097,521 | 7/1963 | Dega | 73/46 X |
| 2,198,411 | 4/1940 | Love | 73/47 |

*Primary Examiner*—Richard C. Queisser
*Assistant Examiner*—Daniel M. Yasich
*Attorney, Agent, or Firm*—John F. Carney

[57] ABSTRACT

The hydraulic system of shock suppressor apparatus for vapor generators utilized in nuclear power plants is provided with integrated fluid circuitry that permits testing for leakage across internal piston seals to be conducted in situ. The fluid circuitry, together with appropriate valving, is operative to hold the piston members of the shock suppressor apparatus in place while testing is conducted and to impart fluid pressures to the system that simulate maximum piston loadings. Sight glass or other detection apparatus is utilized to determine the presence of a leak.

5 Claims, 4 Drawing Figures

PATENTED MAR 5 1974 3,795,139

INVENTOR.
DANIEL A. PECK
BY John F. Carney
ATTORNEY

INVENTOR.
DANIEL A. PECK
BY John F. Carney
ATTORNEY 3,795,139

SNUBBER SEAL LEAKAGE TEST CIRCUIT

BACKGROUND OF THE INVENTION

Nuclear power plants of the pressurized water type comprise a nuclear reactor and one or more steam generators that utilize a primary coolant in the form of pressurized water from the reactor to transform a secondary liquid, normally water, into vapor for operating a prime mover, or the like. In the construction of these plants the vapor generators, which usually comprise vertically elongated pressure vessels, require support means to prevent the vessels from toppling in the event they are subjected to excessive shock loadings as may be developed by earth termors or as a result of equipment failure or unusual operational transients. The support apparatus that is utilized to provide this lateral support must be such as will permit the vessel to freely undergo thermal growth without imparting undue stress to any of its component parts. At the same time, it must be effective to provide rigid lateral support for the vessel when a need for such support arises.

Shock suppressor apparatus has been developed that satisfactorily performs this function. This apparatus commonly comprises an expandable support member including a hydraulic-piston cylinder set and a control valve that operates the set such that its effective length can be adjusted in response to thermally induced relative movements that occur between the vapor generator and the containment structure within which it is disposed. The support apparatus can instantaneously be rendered rigid thus to become a load support member when the vessel is subjected to extraordinary loading, as may occur as a result of earth tremors, equipment failure, or the like. Such apparatus is manufactured and sold by The Grinnell Co., Inc., Providence, Rhode Island under the designation "Hydraulic Shock and Sway Suppressor," Catalogue ph-69, Drawing No. HE-5021-3.

Periodic testing of the shock suppressor apparatus is required in order to insure that the apparatus will be operative if and when conditions occur that required it to be placed in service. Current practice involves checking the operability of this apparatus as part of the procedure followed during normal maintenance shutdowns. Such checks include testing for leakage across the internal seals in each piston-cylinder set in order to determine whether or not, were leakage to occur, the apparatus would be ineffective to provide lateral load support for the steam generator.

To perform this testing the piston member of the apparatus is normally held in a fixed position and a high pressure fluid simulating maximum design load is introduced to the cylinder on one side of the piston. Leakage past the seal is determined by means of a sight glass, or the like, that is connected to the cylinder on the downstream side of the piston. In the past, tests of this nature called for physical detachment of the shock suppressor apparatus from its operative position within the plant and removal to an area where the tests could be conducted. Due to the size of the components that comprise the shock suppressor apparatus, cranes and other unit-handling apparatus were necessary to effect detachment of piston-cylinder sets and to transfer them to the test area. Such procedures are obviously undesirable in that they require the expenditure of considerable time, effort and expense for their accomplishment.

SUMMARY OF THE INVENTION

According to the present invention, shock suppressor apparatus of the described type is provided in its hydraulic system with additional fluid circuitry that is operative to effect in situ testing for fluid leakage across the internal seals of the piston-cylinder sets utilized in the apparatus. Means are provided for applying test fluid to the cylinders at a pressure that simulates piston design loading. The fluid system is arranged such that the application of test fluid occurs simultaneously to two oppositely acting sets whereupon the pistons in each set will be mutually held in a fixed position relative to the cylinders. As test fluid pressure is increased to maximum design loading, the occurrence of any leakage across the piston seals is detected by means of a sight glass that is connected to the respective cylinders on the downstream side of each piston.

In the described system the circuitry utilized for testing is advantageously integrated into the hydraulic system of the shock suppressor apparatus thereby enabling portions of that system to serve also as components of the test circuitry.

For a better understanding of the invention, its operating advantages and the specific objects obtained by its use, reference should be made to the accompanying drawings and description which relate to various embodiments of the invention.

DESCRIPTION OF THE PREFERRED EMBODIMENT

Figure 1:
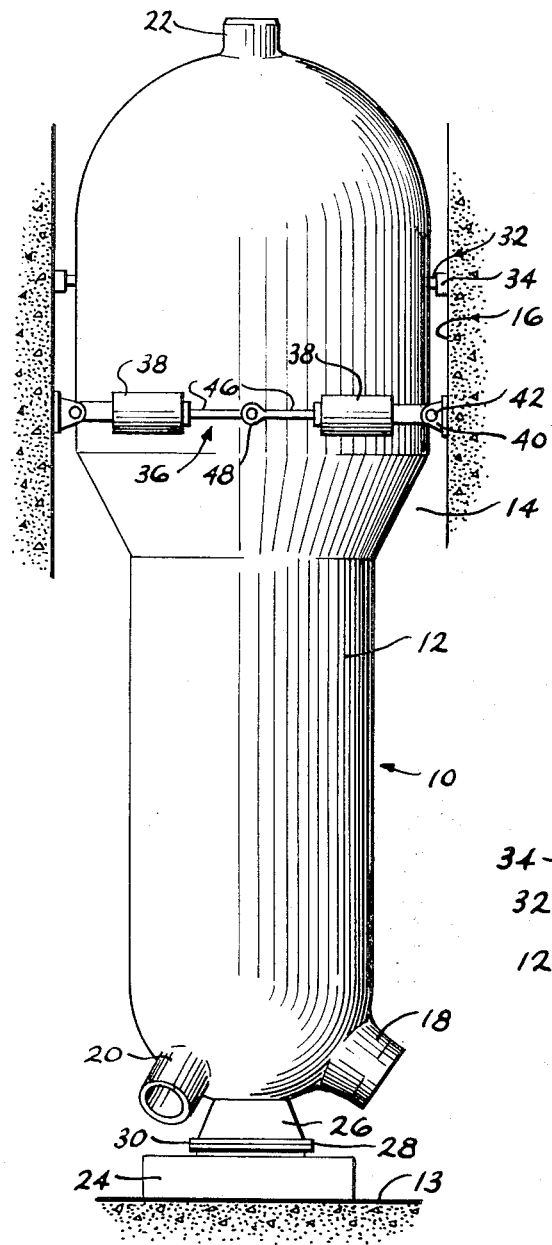
FIG. 1 is an elevational view of a nuclear vapor generator organization utilizing a shock suppressor apparatus with which the test circuit of the present invention is particularly adapted for use.
Figure 2:
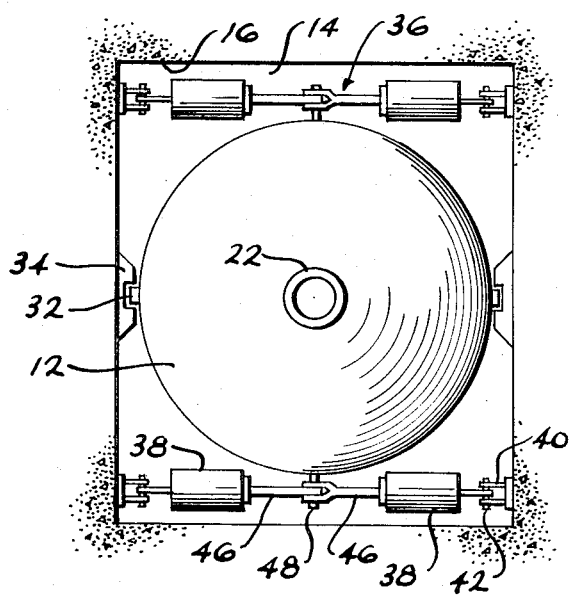
FIG. 2 is a plan view of the vapor generator organization of FIG. 1.

In FIGS. 1 and 2 of the drawings there is shown a nuclear operated vapor generator installation 10 embodying the present invention. It comprises a vertically elongated, cylindrical pressure vessel 12 disposed upon the floor 13 of the dry well 14 defined by containment structure 16. The pressure vessel 12 contains the operating parts of the vapor generator by means of which high temperature coolant fluid from a nuclear reactor (not shown) is placed in heat exchange relation with a secondary liquid, commonly water, to transform the same into vapor. Circulation of the coolant fluid between the vapor generator and the reactor is effected by means of supply and return pipes, 18 and 20 respectively. A vapor outlet nozzle 22 is provided at the top of the vessel to conduct vapor produced therein to a point of use.

The vessel 12 is vertically supported upon a pedestal 24 disposed upon the floor 13 of the dry well 14. It is connected to the pedestal 24 by means of a frustoconical support skirt 26 that is weldedly attached to the bottom end of the vessel. As shown, the skirt 26 is connected about its lower end 38 by appropriate fasteners (not shown) to an upwardly extending portion 30 of the pedestal 24.

It will be appreciated that, as heat is added or removed from the vapor generator, the vessel 12 will be caused to undergo thermal expansion or contraction that occurs in both the vertical and lateral directions. Also, the vessel 12 will experience some lateral translatory motion with respect to the floor 13 of the dry well 14 due to the motion imparted to it as a result of the thermal expansion or contraction of the supply pipe 18. Therefore, in order to assist in maintaining the vertical alignment of the vessel 12 during these periods of thermal growth, a pair of opposed guides may be provided adjacent the upper end of the vessel. In the preferred embodiment, these guides comprise a pair of keys 32 attached to the external surface of the vessel at diametrally opposed sides thereof and spaced guide members 34 secured to the inner surface of the containment structure 16 and between which the keys 32 are free to slide. The guides are arranged to permit translatory motion of the vessel 12 in the direction of the axis of the supply pipe 18 but to prevent motion in any other lateral direction.

The means provided to laterally support the vapor generator vessel 12 against undue shock loading is indicated generally as the shock suppressor apparatus 36. As best shown in FIG. 2, two such assemblies are utilized in the described organization each being disposed on opposite sides of vessel 12. Each shock suppressor apparatus 36 comprises a pair of oppositely spaced cylinders 38 whose closed ends are pivotally attached to the adjacent wall of the containment structure 16 by means of an appropriate connection which may include the illustrated clevis 40 and pin 42. The cylinders 38 each contain a reciprocatable piston 44 having an axially extending piston rod 46. The cylinders 38 and connected pistons 44 are oppositely spaced in mutual horizontal alignment and the opposed piston rods 46 are both attached to the external surface of the vapor generator 12, connecting to a common pivot pin 48, or the like, that extend radially from the external surface of the vessel. As a result of the described structure the opposed pistons 44 in each apparatus 36, being interconnected, are caused to translate in unison.

Seal rings 49 are provided about the pistons 44 to maintain an effective fluid seal within the cylinder between the upstream and downstream sides of the piston. The seal rings 49 may be formed of resilient O-rings and are mounted in circumferential grooves (not shown) provided in the external surface of the pistons. The seal is effected by the engagement of the respective seal rings 49 with the internal surfaces of the associated cylinders 38.

Figure 3:
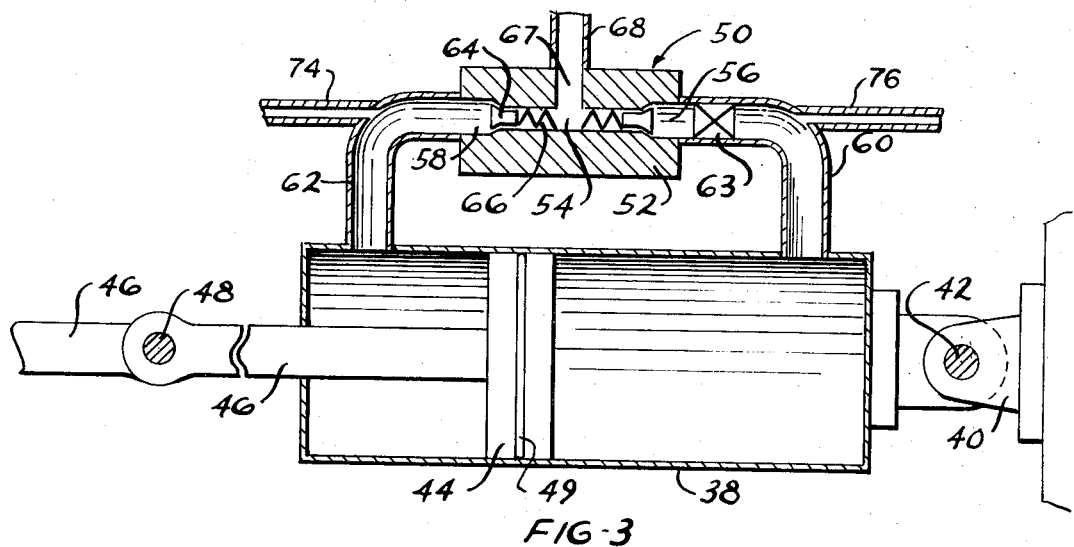
FIG. 3 is an enlarged sectional view of a piston-cylinder set and a control valve that comprises the shock suppressor apparatus.

The shock suppressor apparatus 36 are arranged to permit unrestricted relative movement between the vessel 12 and the containment structure 16 when the vessel undergoes normal thermally-induced movements during various phases of plant operation. Upon the occurrence of a shock load upon the system, however, means are provided to render the shock suppressor apparatus 36 rigid such that they are operative to support the vessel 12 against the lateral forces generated by the shock loading. The assemblies 36 are caused to operate in the described manner as a result of the operation of control valves, indicated as 50, that are associated with each of the piston-cylinder sets. One such control valve 50 is shown schematically in FIG. 3 in operative position with respect to its associated piston-cylinder set. The valve comprises a body 52 having a through passage 54 terminating at each end in enlarged diameter chambers 56 and 58. The chambers 56 and 58 connect with the cylinder 38 on the respective sides of the piston 44 by means of hydraulic lines 60 and 62 respectively. Isolation valves 63 are disposed in each of the lines 60 and serve to isolate the control valve 50 during conduct of the test for piston seal leakage as described hereinafter. The chambers 56 and 58 each contain a poppet 64 that is biased to an open position by means of a spring 66. The characteristics of the springs 66 are such that the respective poppets 64 will be held open during periods of normal translatory activity of the vapor generator vessel 12. During these periods, movements of the respective pistons 44 caused by thermal growth or translation of the vessl vessel upon the floor 13 of the dry well 14 will be imparted to the pistons through the pins 48. Such movement is permitted due to the substantially unrestricted flow of hydraulic fluid from one side of the piston to the other through lines 60 and 62 and the open poppets 64 in the control valve 50. It will be appreciated that, during these periods the interconnected piston pairs in each apparatus 36 will be caused to translate unrestrictedly in unison within their respective cylinders 38.

Figure 4:
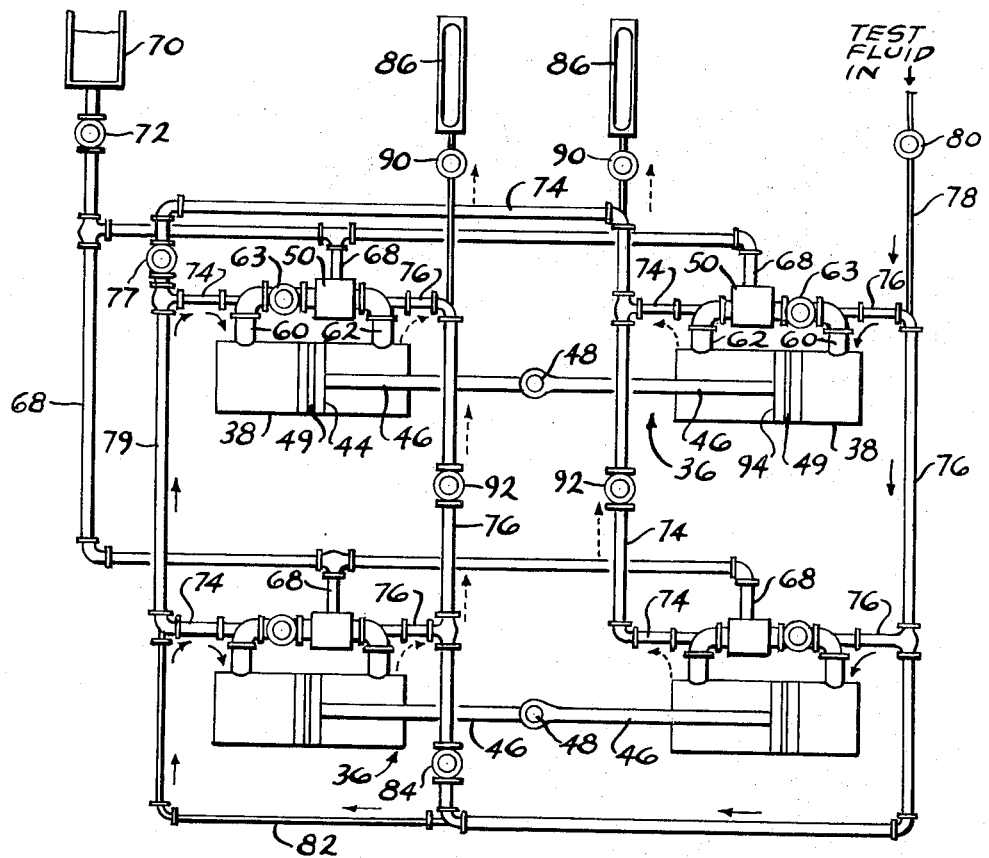
FIG. 4 is a circuit diagram of the hydraulic system employed to operate the shock suppressor apparatus of FIG. 1 and incorporating test circuitry according to the present invention.

To accommodate the difference in cylinder volume on the respective sides of the pistons 44 due to the presence of the piston rods 46, the control valves 50 are provided with bleeder ports 67 which are connected by means of lines 68 to fluid reservoir 70 (FIG. 4). A valve 72 is provided in line 68 downstream of the reservoir 70 and forms part of the test circuit of the present application. Its function is to isolate the reservoir during periods of testing.

FIG. 4 illustrates, in schematic form, the hydraulic system utilized in the operation of the described shock suppressor apparatus 36. As disclosed hereinabove, the operation of the assemblies 36 is governed by the controlled transfer of operation fluid from one cylinder chamber to the other through lines 60 and 62 and the respective control valves 50. The system additionally incorporates a fluid circuit, indicated as line 74, that serves to establish fluid communication between the left hand chambers of all of the cylinders 38 as viewed in FIG. 4. A similar circuit, indicated as 76, connects the right hand chambers of the cylinders. The fluid circuits 74 and 76 each serve to assist in producing the substantially simultaneous operation of the poppets 64 in the respective control valves 50 in the event of undue shock loadings on the vessel. Thus, the circuit formed by lines 74 is operative when the apparatus is subjected to a shock loading to transfer fluid from the left chambers of the cylinders 38 when one or more of the poppets 64 in their associated control valve or valves is slow to close thereby permitting continued movement of the vessel 12 and therefore translation of the piston pairs toward the left. The fluid displaced through lines 74 is distributed to all of the left hand chambers thereby increasing fluid flow through the affected control valve or valves to induce closure of the slow closing poppets.

When movement of the vessel 12, and thereby the connected piston pairs is toward the right the circuit formed by lines 76 is effective to perform the same function with respect to the fluid from the right hand chambers of the respective cylinders 38.

In accordance with the present invention additional circuitry, and appropriate valving, is attached to the hydraulic system that is effective to enable the testing for leakage across the piston seals 49 without the need for dismantling the assembly components. This circuitry includes lines 78 containing operating valve 80 that communicates between a source of high pressure test fluid ideally maintained at about 3,000 psi and that portion of the circuit formed by lines 76 that communicates with the right hand chambers of those cylinders 38 located on the right side of the arrangement as viewed in FIG. 4. Another line, indicated as 82, is connected between line 76 upstream of shutoff valve 84 and that part of line 74 that communicates with the left hand chambers of the cylinders 38 located on the left side of the arrangement. Test fluid is thereby capable of being applied to the respective cylinders 38 in each assembly 36, as shown by the solid arrows in the drawing in a manner as will apply opposite counteracting forces on the respective pistons 40 of each piston pair thereby being effective to maintain them in equilibrium and thus rigidly held stationary in their associated cylinders.

Sight glasses 86 are utilized to detect the presence of leakage fluid past any of the fluid seals. These are connected in the system to those parts of lines 74 and 76 that communicate with respective cylinders 38 on the downstream sides of the respective pistons 40. Connection of the sight glasses 86 to the system can be conveniently effected by connecting the same to the lines 74 and 76, as by means of lines 88 containing sight glass valves 90. The upper ends of the sight glasses is in communication with the atmosphere to permit leakage flow thereinto.

The operation of the above-described vapor generator shock support arrangement is as follows. During periods that the plant is in operation and the assemblies 36 are operative to provide their support function, valves 63, 72, 77, 84 and 92 are maintained in an open condition and valves 80 and 90 are closed. The entire system is filled with operating liquid. As motion occurs in the vapor generator vessel 12 due to thermal growth and translatory motion of the vessel upon the floor 13 of the dry well 14 the piston pairs in the shock suppressor assemblies 36 are caused to move within the respective cylinders 38 in response to the vessel movement and their connection to the vessel at pins 48. Depending upon the direction of movement of the vessel operating liquid will be transferred through the control valve 50 to opposite sides of the pistons 44 either from lines 60 to 62 or vice versa. Since both poppets 64 in each control valve 50 are open movement of the piston pairs will be substantially unrestricted. As described above the liquid volume imbalance caused by the piston rods 46 is accommodated by a flow of liquid through lines 68 to or from reservoir 70.

In the event of excessive transverse loading on the vapor generator, as for example, loading caused by an earth tremor, the excessive rate of flow of operating fluid caused by movement of the piston pair due to their connection with the vessel 12 will cause one of the poppets 64 in each control valve 50 to rapidly close. If the affected poppets 64 in all control valves 50 close simultaneously as will ideally occur the system is immediately imparted with load support capabilities opposing the developed forces due to the incompressibility of the hydraulic system. If, however, one or more of the poppets 64 closes more slowly than the others thereby permitting the vessel 12 to continue its shock induced movement the fluid displaced by those pistons whose associated poppets have closed is distributed to the remaining cylinders 38 through lines 74 or 76 depending on the direction of movement of the piston couples. The increased flow of fluid to the affected control valves 50 is effective to accelerate closure of the still-opened poppet or poppets 64 to prevent further movement in the system.

When it is desired to test for leakage past the seal rings 49 which is important to determine the operability of the shock suppressor assemblies 36 the normally open valves 63, 72, 77 and 84 are closed and valves 90 opened. Valves 92 are also initially retained in their open position. To conduct the test, valve 80 is opened to apply test pressure to the system as indicated by the solid arrows in FIG. 4. As the system is viewed in FIG. 4 of the drawing the respective cylinders 38 will be pressurized on opposite sides of the piston couples, the right chamber of the right hand cylinders being placed in communication with the source of high pressure test fluid through lines 60 and 76 and the left chambers of the left hand cylinders being similarly connected through lines 60, 74 and 82. With test fluid being oppositely applied to the piston couples the pistons are held in place. Any leakage of test fluid that might occur past the seal rings 49 is detectable in the sight glasses 86 that communicate with the respective cylinders through lines 62, 74 and 62, 76. The flow of leakage fluid is indicated in FIG. 4 by the broken lines.

Isolation valves 92 are disposed in lines 74 and 76 respectively for the purpose of isolating the upstream one in each cylinder pair that connects with the respective sight glasses 86. By means of the isolation valves 92, therefore, one of the two cylinders connected to each sight glass can be isolated such that a determination can be made as to which of the two cylinders 38 is leaking when the presence of leakage is detected in the sight glass.

By means of the described apparatus, therefore, there is provided a simple yet effective arrangement for testing the operability of nuclear vapor generator shock suppressor apparatus. The arrangement is particularly advantageous in that it enables testing to be conducted without the need of dismantling the apparatus and transferring it to an area where testing can be accomplished. Additionally, the described advantages are achieved by utilizing much of the fluid circuitry in the hydraulic system of the shock suppressor apparatus with only a minimum of additional equipment being required.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. In combination with shock suppressor apparatus for supporting an upstanding body subjected to relative movement with respect to adjacent stationary base structure, said shock suppressor apparatus including at least one pair of oppositely acting piston-cylinder sets having two aligned, oppositely spaced cylinders attached to said base structure, a movable piston containing a piston seal operative in each of said cylinders, said pistons having piston rods that are connected to said body and mutually interconnected for simultaneous movement of the piston-couple with respect to said cylinders, and fluid system means for supplying operating fluid to the two cylinders in said sets, including means for testing for leakage across said piston seals, in situ comprising:

a. means for simultaneously supplying test fluid to both cylinders in a set, said fluid being admitted to said cylinders on the sides of the respective pistons to generate oppositely acting forces on the interconnected pair of pistons;

b. leakage detecting means; and c. means connecting said leakage detecting means to said cylinders, said means communicating with said cylinders on the sides of the respective pistons opposite to that to which said fluid is admitted.

2. Apparatus as recited in claim 1 in which said leakage detection means includes a sight glass.

3. Apparatus as recited in claim 2 including means for connecting said piston-cylinder sets to said sight glass in series and further including valve means in said fluid system means for isolating a selected one of said sets from said sight glass.

4. Apparatus as recited in claim 1 wherein the test fluid applied to said system emanates from a source at a greater pressure than the pressure in the fluid system of said shock suppressor apparatus and including valve means in said fluid system means for selectively isolating said source from said system during normal operation of said system.

5. Apparatus as recited in claim 4 wherein the pressure of said test fluid is maintained at a level to simulate maximum system design loadings.

* * * * *